United States Patent Office 3,020,394
Patented Feb. 6, 1962

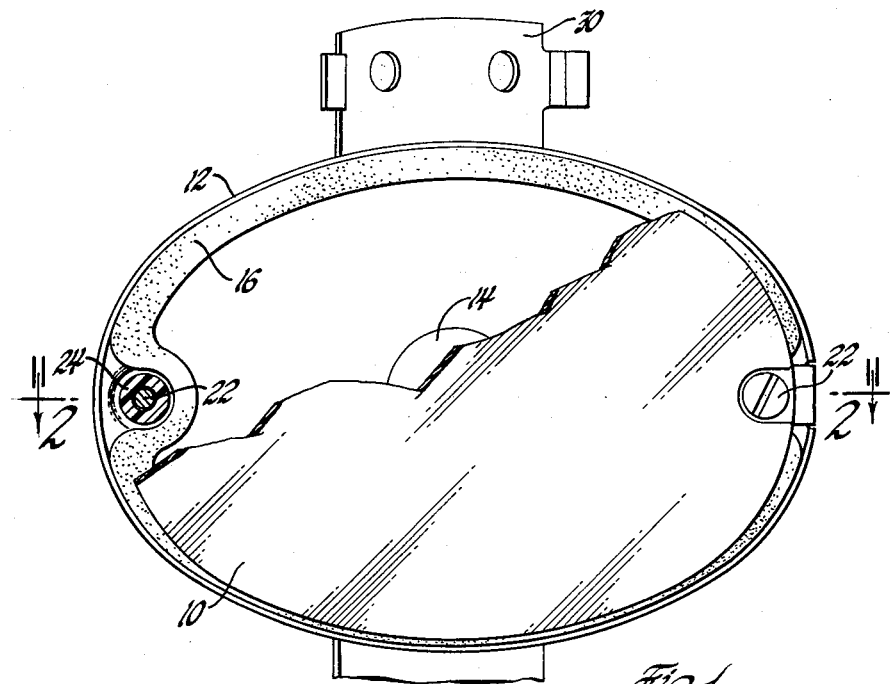
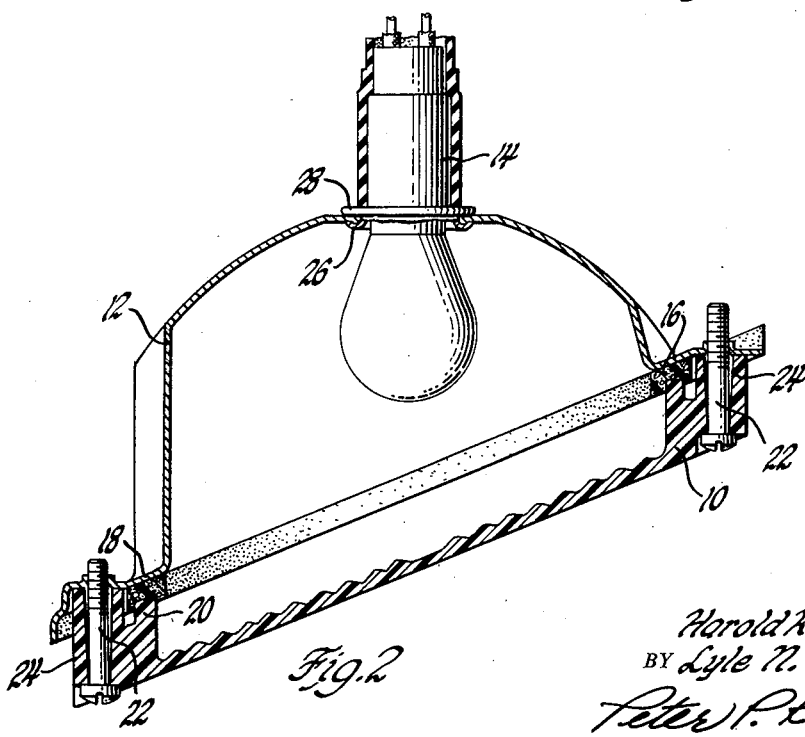

3,020,394
LAMP ASSEMBLY
Harold K. Barnhizer, Lapel, and Lyle N. Williams, Anderson, Ind., assignors to General Motors Corporation, Detroit, Mich., a corporation of Delaware
Filed May 9, 1960, Ser. No. 27,947
5 Claims. (Cl. 240—41)

This invention relates to lamps and the like employing acrylic ester type lenses and more particularly to a lamp having an acrylic ester resin lens in sealing engagement with a vinyl resin foam gasket which will not have a crazing or other deleterious effect on acrylic ester resin lenses.

It is conventional practice to provide automobile lamps as, for example, tail lamps, with lenses made from acrylic ester resins such as methyl methacrylate polymers. Lenses of this type have excellent and undistorted transparency, are economical to manufacture and are unbreakable and durable. The lenses are desirably sealed with respect to the lamp housings in connection with which they are used so as to prevent the ingress of moisture, dirt and other clouding or otherwise deleterious substances. It has been proposed to employ vinyl foam gaskets for sealing the acrylic ester lenses because of their sealing efficiency and economical manufacturing costs. However, insofar as it is known, previous efforts to adapt vinyl foam gaskets for use with acrylic lenses have been unsatisfactory because the gaskets had a distorting or crazing effect on the lenses due undoubtedly to plasticizers which exude from the vinyl foam gaskets.

It is an object of this invention to provide a lamp assembly comprising an acrylic ester resin type lens such as a methyl methacrylate polymer lens in combination with a vinyl resin foam gasket which will not craze or otherwise affect the acrylic ester lenses adversely. It is a further object of this invention to provide a vinyl resin foam composition useful in the manufacture of gaskets suitable for use in abutting contact with acrylic ester type lenses.

These and other objects are accomplished by preparing a formulation consisting of about 100 parts by weight of a vinyl resin such as a polyvinyl chloride polymer in finely divided form, about 70 to 110 parts by weight of a plasticizer, about 3 to 5 parts by weight of dibasic lead phosphite and about 1 to 8 and preferably 2 to 4 parts by weight of N,N'-dinitroso-N,N'-dimethyl terephthalamide, wherein the plasticizer is a polymeric epoxidized vegetable oil having an oxirane oxygen content of about 5.0% to 7.0% and a degree of unsaturation which is represented by an iodine number of about 0.5 to 1.5. These ingredients are thoroughly mixed to produce a polyvinyl plastisol which, on being heated to about 175° F., the decomposition temperature of the N,N'-dinitroso-N,N'-dimethyl terephthalamide blowing agent, will expand or foam, and on being heated further to a temperature in the vicinity of 350° F. will fuse into an elastic sponge or foam material.

A gasket is formed from this formulation by providing a mold having an enclosed cavity, depositing a sufficient quantity of the foamable plastisol to completely fill it on expanding and heating the plastisol to its fusion temperature. During the heating process, the plastisol gels as it reaches its gelling temperature of about 125° F. and expands or foams as it reaches the decomposition temperature of the blowing agent to fill the mold cavity. On reaching the fusion temperature, the plastisol is converted into an elastic sponge or foam gasket.

Other objects and advantages of this invention will become apparent from the following detailed description thereof, reference being had to the accompanying drawings, in which:

FIGURE 1 is a lamp assembly; and
FIGURE 2 is a cross-sectional view of the lamp assembly of FIGURE 1 taken along line 2—2.

In a broad sense the present invention is concerned with a vinyl foam gasket which is assembled in sealing contact with acrylic ester type lenses and which will not have a crazing or other harmful effect on the lenses. As shown in FIGURE 2 of the drawing, a lamp assembly in accordance with the present invention consists of a lens element 10, a housing element 12 which supports an electric bulb and socket assembly 14, and a gasket 16 which is interposed between an annular portion 18 of the housing and an annular projecting rib 20 of the lens. Studs 22 secure the lens element 10 to the lamp housing 12. The studs 22 pass through the relatively heavy cylindrical portions 24 of the lens. The cylindrical portions 24 are of a length such that the gasket member 16 is sealingly clamped between the lens element 10 and the lamp assembly 12 as shown.

The lamp socket 14 is retained within a circular opening of the housing 12 by means of the flanged portion 26 of the lamp socket and the retaining ring 28 which clamp the edges of the housing 12 opening between them. The housing assembly 12 is provided with a bracket 30 by which it may be attached to a car body or the like.

The basic objective of the present invention is the provision of a vinyl foam gasket which does not adversely affect the optical or other properties of acrylic-type lenses. It is known that among the synthetic plastics, methyl methacrylate polymers are outstanding in stability and in optical properties, particularly in clarity and light transmission. It is normally expected that methyl methacrylate lenses suffer practically no discoloration after years of outdoor exposure. Other acrylic-type polymers such as ethyl methacrylate and ethyl or methyl acrylate polymers having similar desirable characteristics may also be used.

As stated above, the present invention is particularly concerned with the provision of a vinyl foam gasket which may be employed as a seal in abutting relationship with an acrylic lens without crazing or otherwise adversely affecting the optical and physical properties of the acrylic material. In the preferred form of the invention a vinyl plastisol is formulated which consists of the following ingredients:

| | Parts |
|---|---|
| Polyvinyl chloride resin | 100 |
| Polymeric epoxidized vegetable oil plasticizer | 90 |
| Dibasic lead phosphite stabilizer | 5 |
| N,N'-dinitroso-N,N'-dimethyl terephthalamide blowing agent | 2 |

Suitable gaskets for use in accordance with the present invention may be manufactured from formulations in which the plasticizer is varied from about 70 to about 110 parts by weight, the dibasic lead phosphite is varied from about 3 to 5 parts by weight and the N,N'-dinitroso-N,N'-dimethyl terephthalamide blowing agent is varied from about 1 to 8 parts and preferably from 2 to 4 parts by weight.

The polyvinyl chloride resin component of the plastisol may be admixed with a polyvinyl acetate resin or the resin ingredient may consist of a copolymer of polyvinyl chloride and polyvinyl acetate. Copolymers of vinyl chloride and vinyl acetate, polyvinylidene chloride, polyvinyl butyral or the like may also be used. It is preferred, however, that the resin component consist essentially of polyvinyl chloride resin.

The polymeric epoxidized vegetable oil employed in the above formulation is a hydrogenated epoxidized vegetable oil having an oxirane oxygen content of between about 5% and 7% and an iodine number of about 0.5 to 1.5 and preferably a value of about 1. In order that the epoxy oils have an oxirane oxygen percentage of between 5% and 7% after hydrogenation, it is, of course, necessary that the oils contain over 5% oxirane oxygen before hydrogenation. During hydrogenation the oxirane oxygen content is reduced about 0.3% to 0.4% and accordingly in order to provide an epoxidized oil having an oxirane oxygen content of at least 5%, it is necessary to hydrogenate a vegetable oil having an oxirane oxygen content of about 5.3% to 5.4%. During the hydrogenation, the double bonds in the oil become saturated to the point where an iodine number of about 0.5 to 1.5 is obtained.

By the term "vegetable oils" is meant oils such as soybean, cottonseed and safflourseed. It is preferred to use a polymerized linseed oil having a molecular weight in the vicinity of 1000, an oxirane oxygen percentage of about 6 and an iodine number of about 1. The epoxized vegetable oils involved in this invention are fully described in the United States Patent No. 2,822,368.

The iodine numbers as used herein refer to those obtained according to ASTM D-1467-57T (Wigs number). The oxirane oxygen percentages are those determined by the Durbetaki method (Anal. Chem. 28, 2000 1956).

Gaskets prepared from the above-described plastisol formulation may be conveniently prepared as follows. A two-part mold is provided having an enclosed mold cavity of the shape of the gasket 16. A quantity of the foamable plastisol is deposited within the mold cavity which is sufficient on expanding to fully occupy the mold cavity. The vinyl plastisol formulation described above will gel on being subjected to heat at a temperature of about 125° F. The N,N'-dinitroso-N,N'-dimethyl terephthalamide blowing agent will decompose at approximately 175° F. to release nitrogen gases capable of blowing or expanding the gelled plastisol. At temperatures of about 350° F. the plastisol will fuse as is well known in the art.

After the foamable plastisol has been deposited in the mold cavity, the mold is inserted in an oven maintained at about 350° F. After a few minutes the plastisol material is heated to the decomposition temperature of the blowing agent, about 175° F. While the temperature rises to the fusion temperature, the plastisol expands to form an elastic foam product. A detailed procedure for preparing a suitable gasket from these formulations is disclosed in the patent application Serial No. 806,548 filed April 15, 1959 and assigned to the assignee of the present invention.

While the embodiment of the present invention as herein described constitutes a preferred form, other forms may be adopted within the spirit of the invention.

We claim:

1. A lamp assembly comprising in combination, an acrylic resin lens element, a lamp housing adapted to support said lens element and a vinyl foam gasket clamped between said housing and said lens element, said vinyl foam gasket being formed from a vinyl plastisol comprising about 100 parts by weight of a finely divided vinyl resin dispersed in about 70 to 110 parts by weight of a plasticizer consisting of a polymeric epoxidized vegetable oil having an oxirane oxygen content of about 5% to 7% and a degree of unsaturation represented by an iodine number of about 0.5 to 1.5.

2. A lamp assembly comprising in combination, a methl methacrylate polymer lens element, a housing adapted to support said lens and a vinyl foam gasket clamped between said lens and said housing in sealing relationship, said vinyl foam being formed from a plastisol composition comprising a polyvinyl chloride resin dispersed in a plasticizer which is a polymeric epoxidized vegetable oil having an oxirane oxygen content of about 5% to 7% and a degree of unsaturation represented by an iodine number of about 0.5 to 1.5.

3. A lamp assembly comprising in combination a methyl methacrylate polymer lens element, a housing adapted to support said lens and a vinyl foam gasket clamped between said lens and said housing in sealing relationship, said vinyl foam being formed from a plastisol composition comprising a polyvinyl chloride resin dispersed in a plasticizer which is a polymeric epoxidized vegetable oil having an oxirane oxygen content of about 5% to 7% and a degree of unsaturation represented by an iodine number of about 0.5 to 1.5, said resin and plasticizer being present in proportions of about 100 parts by weight of the resin to about 70 to about 110 parts by weight of the plasticizer.

4. A lamp assembly comprising in combination a methyl methacrylate polymer lens element, a housing adapted to support said lens and a vinyl foam gasket clamped between said lens and said housing in sealing relationship, said vinyl foam being formed from a plastisol composition consisting substantially of 100 parts by weight of polyvinyl chloride resin dispersed in about 70 to 110 parts by weight of a plasticizer which is a polymeric epoxidized vegetable oil having an oxirane oxygen content of about 5% to 7% and a degree of unsaturation represented by an iodine number of about 0.5 to 1.5, about 3 to 5 parts of dibasic lead phosphite and about 1 to 8 parts by weight of N,N'-dinitroso-N,N'-dimethyl terephthalamide.

5. A lamp assembly comprising in combination a methyl methacrylate polymer lens element, a housing adapted to support said lens and a vinyl foam gasket clamped between said lens and said housing in sealing relationship, said vinyl foam being formed from a plastisol composition comprising about 100 parts of a polyvinyl chloride resin dispersed in about 90 parts of a plasticizer which is a polymeric epoxidized vegetable oil having an oxirane oxygen content of about 5% to 7% and a degree of unsaturation represented by an iodine number of about 0.5 to 1.5, about 4 parts by weight of dibasic lead phosphite and about 2 to 4 parts by weight of N,N'-dinitroso-N,N'-dimethyl terephthalamide.

References Cited in the file of this patent

UNITED STATES PATENTS

| | | |
|---|---|---|
| 2,371,868 | Berg et al. | Mar. 20, 1945 |
| 2,759,866 | Seymour | Aug. 21, 1956 |
| 2,822,368 | Rowland et al. | Feb. 4, 1958 |
| 2,904,522 | Catlin et al. | Sept. 15, 1959 |
| 2,925,487 | Beach | Feb. 16, 1960 |

OTHER REFERENCES

"Modern Plastics," vol. 32, No. 4, December 1954, p. 87. (Copy in Div. 50.)